United States Patent Office 3,398,058
Patented Aug. 20, 1968

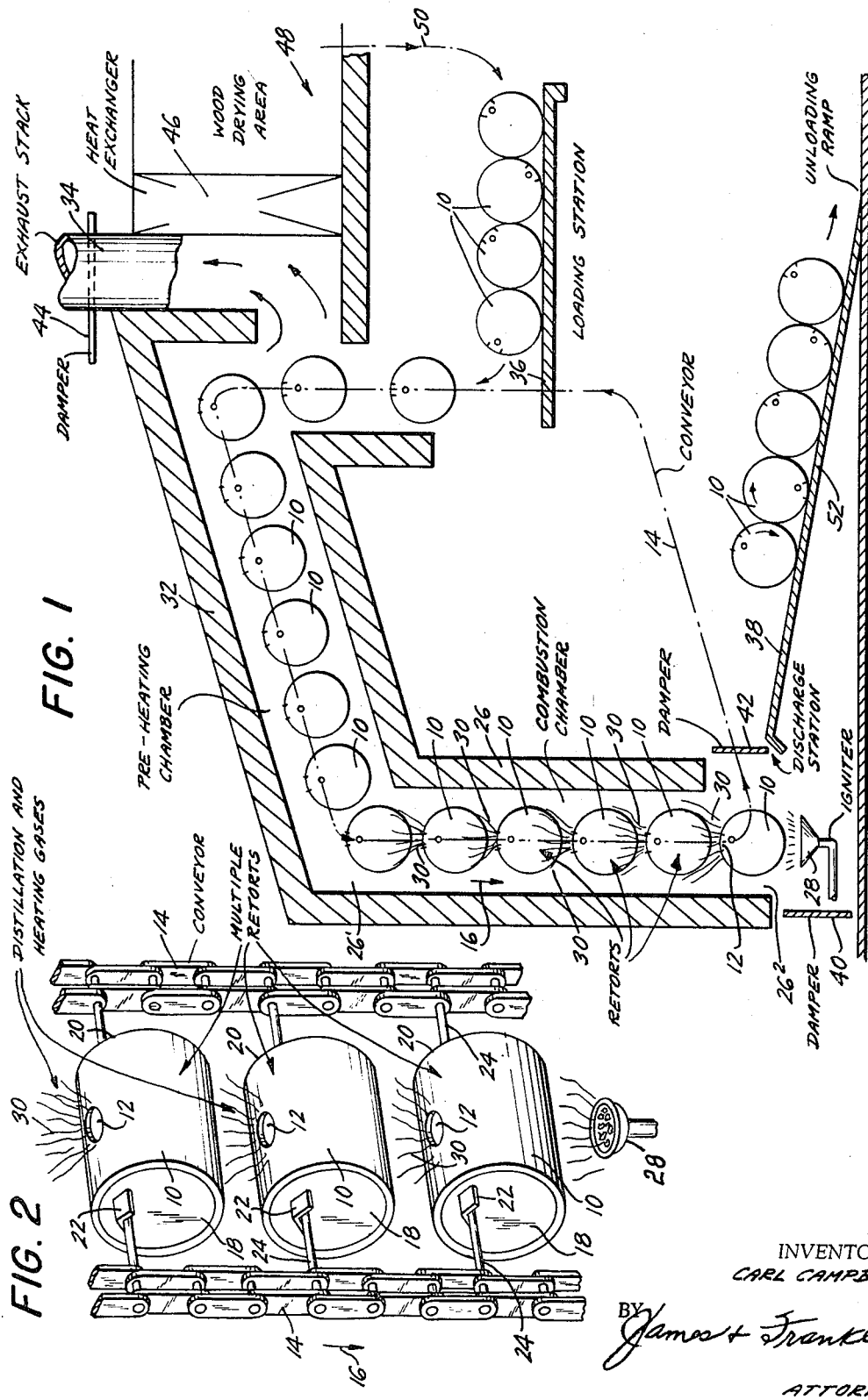

3,398,058
PROCESS AND APPARATUS FOR
CARBONIZING FUEL
Carl Campbell, Roscoe, N.Y. 12776
Filed Aug. 20, 1963, Ser. No. 303,271
12 Claims. (Cl. 201—15)

ABSTRACT OF THE DISCLOSURE

A process and apparatus for carbonizing a solid fuel such as wood and coal in which the fuel is loaded in a series of closed retorts, each retort being provided with a gas vent, the loaded retorts being moved through a combustion chamber with the retorts arranged in serial relation and with the gas vent in each retort facing generally toward the next preceding retort in the series, there being a gas flow path between each said vent and the corresponding next preceding retort, the distilled and burning gases from any given retort and its gas vent becoming the heat source of the next succeeding retort in the series.

---

This invention relates to a process and apparatus for carbonizing a solid fuel such as wood and coal to condense the same to charcoal and coke, respectively.

The prime object of the present invention is the provision of a fuel carbonizing process in which the gases generated or distilled in the carbonization of the fuel are utilized as combustion gases serving as the heat source for the carbonization. A corollary object of the invention is the organization and provision of an apparatus or plant for practicing this process.

In carrying out the process of the invention, the fuel is loaded into a series of closed retorts, each retort being provided with a gas outlet or vent; and the series of the loaded retorts is arranged for movement through a combustion chamber with the retorts disposed in serial relation in such a way that each retort is exposed to the gas vent of the next succeeding retort in the series. The retorts are initially heated to initiate distillation of the carbonization gases, and the gases are fired or set to combustion whereby the distilled and burning gases issuing from the gas vent of any given retort of the series becomes the heat source for the next succeeding retort of the series. In this way, what would otherwise be waste carbonization gases are utilized as the fuel for the heat source for the carbonization system, thus obviating the use of a separate heating fuel. The series of retorts are moved through the combustion chamber from an entrant end to an exit end thereof at a speed to fully carbonize the fuel in each of the retorts, after which the retorts are opened and unloaded. The apparatus or plant is correspondingly designed, the same being organized to effectively carry out the process.

To the accomplishment of the foregoing objects and such other objects as may hereinafter appear, this invention relates generically to the carbonizing process and apparatus as sought to be defined in the appended claims taken together with the description of the following specification and the accompanying drawings, in which:

FIG. 1 is an elevational view of a plant or apparatus designed to practice the process of the invention; and FIG. 2 is a perspective and partial view of certain constructional details thereof.

In the drawings the process steps and essential parts of the apparatus are explained for a more ready understanding thereof by reference to applied legends.

Referring now more in detail to the drawings, reference may first be had to FIG. 2 thereof which shows the serial arrangement and mounting of the multiple or series of retorts employed in the process and which also depicts the operation thereof in the carbonizing system of the invention. The process involves the use of a series of separate retorts 10, 10, each of which comprises a closed retort provided with a gas outlet or vent 12, each retort being adapted to contain a load of a carbonaceous fuel, which in the drawings is indicated as wood, for the production of charcoal. The loaded retorts 10, 10 are arranged in serial relation with each retort 10 exposed to the gas vent 12 of the next succeeding retort in the series. The retorts 10, 10 are detachably mounted on a conveyor 14 which is movable in the direction indicated by the arrow 16. Structurally, each retort may comprise a cylindrical container as shown closed except for the gas vent 12 and provided with a removable end wall 18. The end wall 18 (as well as the opposite end wall 20) is provided with a bearing 22 designed to detachably mount the retort on bolts 24 extending inwardly from and carried by the conveyor 14, which latter preferably is a chain conveyor formed by interconnected links as shown in the drawings. While the retorts may be arranged in serial relation in a number of ways so that each retort is exposed to the gas vent of the next succeeding retort in the series, it is preferred to arrange the series of retorts in superposed vertical relation as shown.

Referring now to FIG. 1 of the drawings, a continuing series of retorts 10 is shown detachably mounted on a continuous conveyor chain 14 in such a way that a group, such for example as six retorts 10, 10, is positionable at any one time in a combustion chamber 26. The combustion chamber 26 comprises a stack made of a refractory material constructed so as to confine around the retorts the combustion gases to be referred to. The conveyor 14 is moved in the direction indicated by the arrows thereon, and thereby the group of retorts in the combustion chamber 26 is moved in the arrowed direction 16 from an entrant end 26' to an exit end $26^2$ of the combustion chamber. At the bottom of the combustion chamber is located a heater and igniter 28.

The operation of the system may now be conveniently explained by reference to the action that takes place in the combustion chamber at the initial and continuing practice of the operation. The heater 28 is first ignited to initially heat at least some of the retorts to initiate distillation of the combustion gases therefrom. The distilled gases 30 issuing from the retort vents 12 take fire in succession. In the practice of the process when the gases issuing from the fourth retort from the bottom start to burn, the igniter 28 is shut off. When the gases issuing from the topmost retort start to burn, the system is ready for a continuous operation, the conveyor being then set into motion for effecting the continuous operation of the system. In this operation the distilled gases 30, 30 from a given retort in the combustion chamber, burning at its gas vent, become the heat source for the next succeeding retort in the series as clearly depicted in FIGS. 1 and 2 of the drawings, and thereby the generated or distilled gases in the carbonization of the fuel function as combustion gases and serve the heat source for the carbonization of the fuel. The conveyor chain 14 (and the series of retorts thereon) is moved through the combustion chamber from the entrant end to the exit end thereof at a controlled speed such that the fuel in each of the retorts is fully carbonized. As will be noted, the movement of the retorts in the combustion chamber is countercurrent to the current of air which enters the combustion chamber at its bottom end and the flow of the generated combustion gases.

Preferably the plant or apparatus is designed to preheat the loaded retorts before entering the combustion chamber, and for this purpose the entrant end of the combustion chamber communicates with a preheating chamber 32 as clearly shown in FIG. 1 of the drawings. The exhaust fumes flowing upwardly through the combustion chamber thus move through the preheating chamber for progressively preheating the fuel contents of the retorts 10 moving through the preheating chamber, the exhaust fumes then moving out through an exhaust stack 34.

For the continuous operation of the system there is provided at one point or region of the conveyor chain 14 a loading station 36 and at another point or region of the conveyor chain 14 an unloading or discharge station 38. At the loading station the fuel loaded retorts 10, 10 are mounted on the conveyor chain and at the discharge station 38 the retorts 10 with their charred contents are removed or unloaded from the conveyor chain.

Suitable dampers 40, 42 and 44 are provided to govern the flow of air and exhaust gases. Preferably a fume-to-air heat exchanger 46 is provided to heat the air for drying the wood at a wood drying area 48 prior to the wood being placed in the retorts. This wood drying area is preferably located so as to be in communication with the loading station 36 as indicated by the arrows 50. The finished retorts which are removed from the conveyor chain 14 at the discharge station, are conveyed by an unloading ramp 52 to a plant space where the retorts are opened by removal of the end walls 18 and the charcoal discharged therefrom.

The practice of the process and the use of the apparatus of the present invention will be fully apparent from the above detailed description thereof. In the process the gases generated or distilled in the carbonization of the fuel are utilized as the combustion gases and therefore as the heat source for the carbonization, thus obviating the use of any separate heating fuel. Each retort in the system becomes an increment of charcoal production. The retorts 10, 10 are loaded with the fuel such as wood, at the removable ends thereof and are then closed tightly. The retorts are first conveyed through the preheating chamber and then through the combustion chamber. At the initiation of the operation the igniter 28 is lit and utilized until the heating cycle starts, at which point the igniter is cut off. When the group of retorts in the combustion chamber becomes ignited, with the distillation gases issuing therefrom functioning as the combustion gases for the system, the movement of the conveyor is started for continuous operation. It is to be understood that the movement of the conveyor chain 14 is intermittent in its otherwise continuing operation. The retorts advance in the combustion chamber countercurrent to the flow of air therein, each retort replacing the one ahead of it in the intermittent operation. At the dwell periods of this operation the loading and unloading of the retorts take place.

Temperatures of the order of 3000° F. in the vicinity of the retort vents 12 drop sharply at the refractory walls of the combustion chamber. The air damper 28 at the bottom of the combustion stack gives a considerable measure of temperature control, and in the event of any misfiring during operation, this damper may be closed to snuff out further combustion in short order.

It will be apparent that many changes may be made in the apparatus and the parts thereof and in the process steps without departing from the spirit of the invention as defined in the following claims.

I claim:

1. The process of carbonizing a solid fuel such as wood and coal which consists in loading the fuel in a series of closed retorts, each retort provided with a gas vent, in arranging the series of loaded retorts for movement through a combustion chamber with the retorts in serial relation and with the gas vent in each retort facing generally toward the next preceding retort in the series, there being a gas flow path between each said vent and the corresponding next preceding retort, in initially heating at least some of the retorts to initiate distillation of combustion gases therefrom, the gases being then fired whereby distilled and burning gases from any given retort at its gas vent becomes the heat source of the next succeeding retort in the series.

2. The process of carbonizing a solid fuel such as wood and coal which consists in loading the fuel in a continuing series of closed retorts each provided with a gas vent, in arranging the series of loaded retorts for movement through a combustion chamber with the retorts in serial relation and with the gas vent in each retort facing generally toward the next preceding retort in the series, there being a gas flow path between each said vent and the corresponding next preceding retort, in initially heating at least some of the retorts to initiate distillation of combustion gases therein, in igniting and burning the gases, the distilled and burning gases from any given retort at its gas vent becoming the heat source of the next succeeding retort in the series, and in moving the series of retorts through the combustion chamber from an entrant end to an exit end therein at a speed to carbonize the fuel in each of the retorts.

3. The process of claim 2 in which the retort series is moved through the combustion chamber countercurrent to the flow therein of the combustion gases.

4. The method of claim 2 in which a preheating chamber connects with the combustion chamber at the entrant end thereof, and in which the retort series is moved through the preheating chamber and thence into the combustion chamber.

5. The method of claim 2 in which the combustion chamber is arranged substantially vertically, and the retorts moving through the said chamber are in superposed relation.

6. An apparatus for carbonizing a solid fuel such as wood and coal comprising a combustion chamber, a series of closed fuel retorts each provided with a gas vent, and means mounting said series of retorts for movement through said combustion chamber with the retorts arranged in said combustion chamber in serial relation and with the gas vent in each retort facing generally toward the next preceding retort in the series, there being a gas flow path between each said vent and the corresponding next preceding retort, whereby distilled gases from a given retort burning at its gas vent becomes the heat source for the said next succeeding retort in the series.

7. An apparatus for carbonizing a solid fuel such as wood and coal comprising a combustion chamber, a continuing series of closed fuel retorts each provided with a gas vent, means mounting said series of retorts for movement through said combustion chamber with the retorts arranged in said combustion chamber in serial relation and with the gas vent in each retort facing generally toward the next preceding retort in the series, there being a gas flow path between each said vent and the corresponding next preceding retort, whereby distilled gases from a given retort burning at its gas vent becomes the heat source for the said next succeeding retort in the series, and means for moving the series of retorts through the combustion chamber at a speed to carbonize the fuel in each of the retorts.

8. An apparatus for carbonizing a solid fuel such as wood and coal comprising a combustion chamber, a series of closed fuel retorts each provided with a gas vent, means mounting said series of retorts for movement through said combustion chamber with the retorts arranged in said combustion chamber in serial relation and with the gas vent in each retort facing generally toward the next preceding retort in the series, there being a gas flow path between each said vent and the corresponding next preceding retort, means for initially heating at least some of the retorts to initiate distillation of combustion gases therein, distilled gases from any given retort ignited and burning at its gas vent becoming the heat source for the said next succeeding retort in the series, and means for moving the said mounting means to move the retort series through the combustion chamber from an entrant end to an exit end thereof at a speed to carbonize the fuel in each of the retorts.

9. The apparatus of claim 8 in which the mounting means comprises a movable endless chain providing means for detachably mounting the retorts thereon.

10. In the apparatus of claim 9, a preheating chamber connecting with the combustion chamber at the entrant end thereof, whereby the retort series is first moved through the preheating chamber and thence to and through the combustion chamber.

11. In the apparatus of claim 9, a retort loading station at one point of said endless chain, and a retort discharge station at another point of said chain.

12. In the apparatus of claim 9, a preheating chamber connecting with the combustion chamber at the entrant end of the latter, the spent gases of the combustion chamber thereby moving through the preheating chamber, a retort loading station arranged at one point of said endless chain in a position in advance of the preheating chamber, and a retort discharge station arranged at another point of said endless chain in a position past the exit end of the combustion chamber.

References Cited
UNITED STATES PATENTS 1,911,473  5/1933  Simpson _____ 201—27

JOSEPH SCOVRONEK, *Primary Examiner.*